Feb. 13, 1968  S. M. DE CORSO  3,369,067
NONCONSUMABLE ANNULAR FLUID-COOLED ELECTRODE FOR ARC FURNACES
Filed Aug. 16, 1965
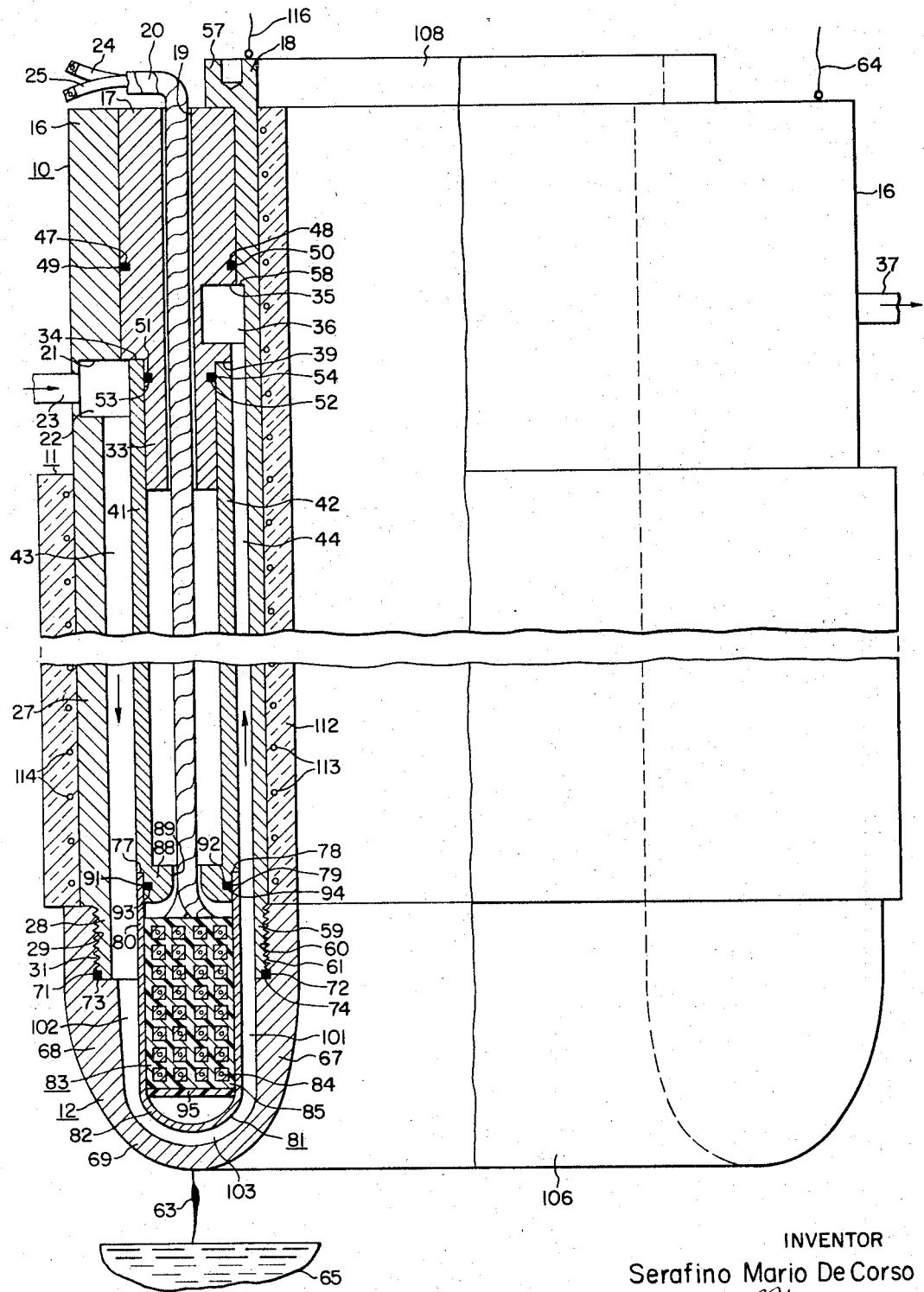
INVENTOR
Serafino Mario De Corso
BY *Maury I. Hull*
ATTORNEY

United States Patent Office 3,369,067
Patented Feb. 13, 1968

3,369,067
NONCONSUMABLE ANNULAR FLUID-COOLED
ELECTRODE FOR ARC FURNACES
Serafino Mario De Corso, Wilkins Township, Pittsburgh,
Pa., assignor to Westinghouse Electric Corporation,
Pittsburgh, Pa., a corporation of Pennsylvania
Filed Aug. 16, 1965, Ser. No. 479,965
14 Claims. (Cl. 13—18)

This invention relates to improvements in electrodes for arc furnaces, and more particularly to an improved fluid-cooled electrode having magnetic field producing means for continuously moving the arc over the arcing surface.

Although it has been known for many years that the only practical way to prevent sublimation of material from the arcing surface of a metal electrode as a result of the intensely hot arc spot, with ultimate burn-through and destruction of the electrode, was to employ fluid cooling to conduct heat away from the metallic arcing surface, nevertheless prior art solutions to the problem of providing a structure which would have sufficient fluid flow capacity to remove the necessary heat flux, while providing sufficient current carrying capacity for the arc current, and at the same time making provision for mounting a magnetic field producing coil near the arcing surface to set up a field of sufficient magnitude to continually move the arc, have usually resulted in serious compromises between the three requirements, with the result that the capacity and useful life of the electrode was limited in one way or another.

In a copending application of A. M. Bruning for "Electric Arc Furnace and Nonconsumable Electrode Suitable for Use Therein," Ser. No. 407,332, filed Oct. 29, 1964, and assigned to the assignee of the instant invention, there is described and claimed a substantially nonconsumable electrode in which a water-cooled arcing surface is provided, with magnetic field producing means for substantially continually moving the arc around the arcing surface to prevent burn-through, and the nonconsumable electrode of the Bruning patent application has a useful life order of magnitude greater than the life of a consumable carbon or graphite electrode currently used on a wide scale in arc furnaces.

The instant invention is an improvement over, and further advance in the art over, the basic electrode described and claimed in the Bruning copending patent application. I utilize an annular tip or electrode face member composed of electrically conductive and highly heat conductive material threadedly secured to a tubular electrode body portion composed of a plurality of concentric tubes and having a cylindrical fluid channel between tubes for bringing a cooling fluid to the electrode tip or face member to which the arc strikes, and an additional cylindrical fluid channel between two other tubes of the concentric tubes of the body portion for conducting fluid from the electrode face member. A fluid-cooled magnetic field coil is disposed in the electrode face member in such a manner as to provide an annular cup-shaped fluid passageway back of the arcing surface, around the entire annular electrode face member.

I provide an improved heat shield on the outside of the electrode, and furthermore my electrode has a large central passageway extending the entire length thereof, with an additional heat shield protecting the surface of the central passageway from heat of radiation and convection, both heat shields also limiting the amount of heat conducted away from the furnace by the fluid-cooled surfaces of the electrode.

Accordingly a primary object of the invention is to provide a new and improved fluid-cooled electrode.

Another object is to provide a new and improved fluid-cooled electrode suitable for use in an arc furnace.

Still a further object is to provide a new and improved fluid-cooled electrode having improved magnetic field producing means for substantially continuously moving the arc around the arcing surface of the electrode.

An additional object is to provide a new and improved electrode having a tubular configuration with a central aperture for feeding material, including fuse material, through the electrode into a furnace.

Still a further object is to provide a new and improved electrode having improved heat shield means for protecting the electrode from heat of radiation and convection.

An ancillary object of the invention is to provide a new and improved electrode having a tubular construction formed of a plurality of concentric tubes with fluid flow passages between certain of the tubes.

Other objects and advantages will become more clearly apparent after a study of the following specification, when read in connection with the accompanying drawing, in which the single figure thereof represents a partially sectional and partially side-elevational view of an electrode according to the preferred embodiment of the invention.

In the drawing, the electrode has a tubular body portion generally designated 10, an outside heat shield generally designated 11, and an electrode face member or tip member generally designated 12, composed of highly heat conductive and electrically conductive material such as copper and providing an arcing surface. The upper or head portion of the electrode is seen to include three concentric sleeves or tube portions 16, 17 and 18, the tube portion 17 having an axially extending bore 19 therethrough for the passage of lead sheath 20 to a field coil hereinafter to be described.

Outer tube or sleeve 16, which may be composed of, for example, steel but is preferably composed of a material having both mechanical strength and good electrical conductivity, has an annular groove or channel cut therein and extending around the entire tube, the groove being shown at 21 and being provided to form a fluid header 22 connected by fluid inlet means 23 with a suitable source of cooling fluid, not shown, such as water under pressure. Below the groove 21, or in the lower portion of tube 16, there is a portion of increased inner diameter 27, terminating in a portion 28 at the bottom thereof of reduced outer diameter and reduced wall thickness and having threads 29. The threads 29 are in threaded engagement with threads 31 of the aforementioned electrode face member 12 hereinafter to be described in greater detail.

The aforementioned sleeve or tubular portion generally designated 17 is seen to be relatively thick and to have a lower portion 33 which is of both reduced outer diameter and increased inner diameter. The outside wall of the tube 17 is cut in a manner to form a shoulder 34 which aligns with the upper wall of the aforementioned fluid header 22. The inside wall of the tubular portion 17 has a cutaway portion 35 to form an annular fluid header 36 which communicates with a fluid outlet 37. The inside wall of the tubular member 17 is shaped in such a manner as to form a shoulder 39 as shown.

Abutting against the aforementioned shoulders 34 and 39 are two cylindrical concentric sleeves 41 and 42, which are provided for purposes to be hereinafter described in detail, but it may be stated here that sleeve 41 has an outer diameter so as to provide a cylindrical space 43 between the outer wall of the sleeve and the inner wall of the aforementioned tube portion 27, the cylindrical space 43 providing a cylindrical fluid flow passage for conducting fluid from the aforementioned fluid header 22 to the aforementioned electrode tip or electrode face member 12. In like manner, the cylindrical sleeve 42 has an inside diameter so that a cylindrical space 44 is formed between sleeve 42 and the adjacent wall of the aforementioned tube or sleeve 18, the space 44 forming a fluid flow passage and being provided for conducting fluid from electrode face member 12 to the fluid header 36 and thence to fluid outlet 37.

The tubular portion 17 is also seen to have two annular grooves 47 and 48 therein for containing O-rings 49 and 50 respectively. These provide for sealing between the adjacent tubes. Tube 17 also has annular grooves 51 and 52 therein for O-rings 53 and 54 respectively. These annular grooves 47 and 48 and 51 and 52 with their respective O-rings are desirable for providing fluid-tight seals between the adjacent tubular portions of the electrode body.

The aforementioned tubular portion 18 of the electrode body is seen to have an upper flange portion 57, a cutaway portion forming shoulder 58, and a threaded bottom end portion 59 having threads 60. Shoulder 58 is plane with the upper wall of the aforementioned fluid header 36, as shown. Threads 60 mesh with threads 61 on the aforementioned electrode face member 12.

The tubular body portion of the electrode, at least a portion of which is composed of electrically conductive material, brings an electrical current for producing and sustaining an arc 63 from the electrode face member 12 to a surface of opposite polarity, a melt or another electrode. Means symbolized by lead 64 is connected to one terminal of a source of electrical potential, not shown, which has the other terminal thereof operatively connected to the aforementioned surface of opposite polarity, illustrated by melt 65. The arc 63 may take place to a melt which is composed at least partially of conductive material. Where alternating current is used to produce and sustain the arc, because of the skin effect, most of the current may flow to the arc 63 along the outer tube 16, and preferably this tube 16 is electrically conductive or at least has an electrically conductive coating thereon.

The aforementioned electrode face member is generally in the form of an annular cup having generally cylindrical inner wall portion 67, generally cylindrical outer wall portion 68, and an annular bottom wall portion arcuate in cross-section 69. The aforementioned threads 31 are on the inner surface of the upper end of the outer wall portion 68, and aforementioned threads 60 are on the surface of the upper end of the aforementioned inner wall portion 67 which is adjacent tube 18, these threads 31 and 60 being in threaded engagement with threads on the lower ends of concentric tubes 16 and 18 respectively, as shown. Two annular grooves 71 and 72 contain O-rings 73 and 74 respectively for providing effective fluid seals.

The lower ends of the aforementioned cylindrical sleeves 41 and 42, which may be, if desired, joined to each other by an annular end ring 88, which may be formed integrally with sleeves 41 and 42, are shaped to provide annular shoulders 77 and 78 respectively so that the lower ends of the sleeves will receive the inner and outer cylindrical walls of a generally annular cup-shaped field coil housing and fluid channeling member generally designated 81. Disposed inside the coil housing and fluid channeling member 81 is a field coil generally designated 83 consisting of a plurality of turns 84 embedded in insulation 85 and having fluid flow passages therethrough. The leads 24 and 25 to the coil generally designated 83 are seen to pass into an aforementioned sheath 20, which passes through a bore or aperture 89 in the annular end ring 88 which joins the bottoms of the sleeves 41 and 42. O-rings 91 and 92 in grooves 93 and 94 respectively provide fluid tight seals between the outer and inner walls 80 and 79 of the annular cup-shaped coil holder generally designated 81 and the adjacent walls of the sleeves 41 and 42. There is an annular ring of heat resistant insulating material 95 in cup member 81 which supports the bottom of the coil 83.

It is seen that the annular cup-shaped coil housing member generally designated 81 provides annular space 101 between wall 79 of the coil housing 81 and wall 67 of the electrode face member 12; coil housing member 81 also provides annular space 102 between wall 80 of housing 81 and wall 68 of electrode face member 12; the curved annular bottom 82 of coil housing 81 is spaced from arcuate end portion 69 of electrode face member 12 to provide an annular passageway 103, arcuate shaped, joining fluid flow passages 101 and 102. The result of the annular passageways 101–103–102 is that fluid entering the passageway 43 flows around all the entire back surfaces of the wall portions 68–69–67 of the electrode face member generally designated 12; this fluid flowing through the passageways 102–103–101, which annular passageways extend around the entire perimeter or circumference of the electrode face member 12 from which arc 63 takes place, provide that heat flux, conducted to the outer surface of the face member 12 by radiation and convection from the melt and the hot gases, and also heat flux created by the intensely hot arc spot of arc 63, are transferred to the fluid and removed by way of passageway 44, outlet fluid header 36, and fluid outlet 37.

The electrode is seen to have a large substantially central passageway 106 extending the entire length thereof, this passageway 106 being open at the top of the electrode unless covered by a removable cover plate 108. Passageway 106 permits material to be fed to the melt 65 through the electrode, and also may be used for inserting fuse material to start the arc 63.

It is seen that an annular or cylindrical heat shield composed of highly heat resistant or refractory material such as a heat resistant ceramic 111 extends from the upper surface of electrode face member 12 the entire length of the inner passageway 106 through the electrode. Heat shield 112 as well as the aforementioned heat shield 11 may have reinforcing wires extending therethrough, these being shown at 113 and 114 respectively.

If desired, an additional electrical lead 116 may be connected to the tube 18 of the supporting structure, lead 116 being connected to the same terminal of the source which lead 64 is connected to, and in that case the sleeve or tube 18 would be composed at least partially of conductive material or coated with conductive material.

A phenomenon known as current bunching may occur in an electrode of the type shown; it may be said that there is movement within the electrode and the electrode tip structure of a current filament or filaments; current bunching occurs at the arc site, the current flowing down the two concentric tubes 16 and 18 and bunching at the point where the arc 63 makes contact with the electrode face member 12. Forces applied to the current filament within the electrode structure of sufficient magnitude to cause the current filament to move at high speed may lead to arc spot skipping and multiple arc spots or diffused arcing, which generally speaking are desirable since they reduce that portion of the temperature rise of the arcing surface which results from the arc at the site of the arc spot.

My electrode encourages diffused arcing by providing a magnetic field of greater strength on the current filament in bottom 69 than on the arc 63; this follows from the fact that the bottom 69 is closer to the source of the magnetic field than the arc is.

If desired the coil cup or housing 81 may be formed integrally with the electrode face member 12, being maintained in spaced position therefrom by a plurality of arms or studs at spaced intervals around the periphery of the electrode face member, and fixed to both face member and housing.

Whereas I have shown and described my invention with respect to an embodiment thereof which gives satisfactory results, it should be understood that changes may be made and equivalents substituted without departing from the spirit and scope of the invention.

I claim as my invention:

1. A nonconsumable arc electrode comprising, in combination, electrode face means composed of non-magnetic, conductive material and providing an arcing surface, magnetic field producing means disposed near the arcing surface of the electrode face means, the electrode face means including a generally annular cup-shaped member having inner and outer wall portions and a curved bottom portion and being hollow in the annular central portion thereof, the magnetic field producing means including a coil and annular cup-shaped coil housing means mounted in the electrode face means, the walls of the coil housing means being spaced from the walls of the electrode face means to provide inner and outer fluid passageways and a bottom fluid passageway whereby a cooling fluid may flow around the inner wall surface of the entire annular cup-shaped electrode face means, and a tubular structure including at least three concentric tubes each extending substantially the entire length of the electrode, the tubular structure being composed at least partially of conductive material and supporting the magnetic field producing means and the electrode face means and making electrical connection with the electrode face means, the tubular structure including means providing a plurality of passageways including at least one annular passageway for the flow of a cooling fluid to a passageway in the electrode face means and another annular passageway for conducting fluid from a passageway in the electrode face means, the tube of smallest diameter forming a central passageway through the electrode, the conductive portion of the tubular structure being adapted to have a source of electrical potential connected thereto for producing an arc from the arcing surface of the electrode face means, the magnetic field causing the arc to move substantially continuously over said arcing surface.

2. A nonconsumable arc electrode according to claim 1 including, in addition, thermally insulating means disposed around at least a portion of the outside wall of the tubular structure.

3. A nonconsumable arc electrode comprising in combination, a tubular structure including a first sleeve forming a central passageway through the electrode, a second sleeve disposed around the first sleeve coaxially therewith and forming an annular passageway therebetween, at least one of the first and second sleeves being composed at least partially of electrically conductive material, a third sleeve of greater diameter than the second sleeve and forming an additional annular passageway between the second sleeve and the third sleeve, fluid inlet means and fluid outlet means communicating selectively with the annular passageway and the additional annular passageway, electrode face means mounted at one end of the tubular structure, the electrode face means being generally in the form of an annular cup member having inner and outer cylindrical wall portions and a curved bottom wall portion forming an arcing surface, the electrode face means being hollow and having disposed therein a magnetic field coil mounted in a coil housing, the coil housing being so dimensioned that a space exists between the housing and the inner wall of the electrode face means at all points thereon and providing annular fluid passageways adjacent the wall portions of the electrode face means and a further annular passageway adjacent the curved bottom wall portion which forms the arcing surface of the electrode face means, means including a sleeve of conductive material forming an electrical circuit to the electrode face means for producing and sustaining an arc from the arcing surface of the electrode face means, and means connected to the coil for energizing the coil to set up a magnetic field at the arcing surface of the electrode face means which causes the arc to rotate.

4. An electrode according to claim 3 including, in addition, first cylindrical heat shield means disposed around the outside of the electrode, and second cylindrical heat shield means disposed around the inside wall of the electrode in the central passageway through the electrode.

5. A nonconsumable arc electrode comprising in combination, a tubular structure including first and second concentric sleeves forming a passageway therebetween, the first sleeve forming a central passageway through the electrode, at least one of the first and second sleeves being composed of a conductive material, a third sleeve disposed around the second sleeve coaxially therewith whereby a further passageway is formed between the second and third sleeves, one of said passageways being a fluid inlet passageway, the other of said passageways being a fluid outlet passageway, annular cup-shaped electrode face means threadedly secured to the bottom ends of the first and third sleeves, the cup-shaped electrode face means being hollow on the inside thereof and having inner and outer cylindrical wall portions and a curved bottom wall portion forming an arcing surface, and magnetic field producing means including a coil mounted in an annular coil housing disposed inside the electrode face means, the coil housing being spaced from the inner walls of the electrode face means to provide fluid flow passageways communicating with the passageways between sleeves, there being a curved annular space around the bottom of the electrode face means between the coil housing and the bottom inner wall of the electrode face means to complete a passageway for the flow of a cooling fluid around the entire inner wall of the cup-shaped annular electrode face means to conduct heat flux therefrom.

6. An electrode according to claim 5 including, in addition, heat shield means disposed around the outside of one of the sleeves, and other heat shield means disposed around the inside of one of said sleeves within the central passageway passing through the electrode.

7. An electrode according to claim 5 including, in addition, fluid inlet header means communicating with one of the passageways between sleeves, and fluid outlet header means communicating with the further passageway between sleeves, and fluid inlet means and fluid outlet means communicating with respective header means.

8. In an electrode, electrode face means forming an arcing surface, the electrode face means including an annular cup member composed of conductive material having inner and outer wall portions and a curved bottom wall portion, the electrode face means including annular coil housing means disposed within the annular cup member, the coil housing means having inner and outer cylindrical wall portions and a curved bottom wall portion which substantially follows the contour of the bottom wall portion of the electrode face means, all of the wall portions of the coil housing means being spaced from adjacent wall portions of the annular cup member of the electrode face means whereby inner and outer annular fluid passageways and a curved bottom annular fluid passageway are formed around the entire coil housing means between the walls of the coil housing means and the inner walls of the annular cup member of the electrode face means, and means forming a central passageway extending axially through the electrode.

9. An electrode according to claim 8 wherein the means forming the central passageway is additionally characterized as including a first tube, and including, in addition, an electrode body portion for supporting the electrode face means including second and third tubes of graduated diameters mounted concentric with the first tube, the inner and outer cylindrical wall portions of the electrode face means being threadedly secured to the bottom ends of the first and third tubes.

10. An electrode according to claim 9 including, in addition, a plurality of fluid header means for the concentric tubes forming passageways for bringing fluid to and from the annular cup-shaped electrode face means.

11. A nonconsumable electrode for use in an arc furnace, comprising, in combination, an annular cup-shaped electrode face member composed of nonmagnetic material having good electrical and thermal conductivity and providing an arcing surface, the cup-shaped electrode face member being hollow and having inner and outer cylindrical wall portions and a bottom wall portion arcuate in cross-section, a generally U-shaped annular coil housing disposed within the annular electrode face member, means mounting the annular coil housing in the electrode face member whereby the coil housing is spaced therefrom at all points to form passageways for the flow of fluid adjacent the inner and outer cylindrical wall portions of the cup-shaped electrode face member and also form a passageway adjacent the arcuate bottom wall portion of the electrode face member, a field coil in the coil housing, an electrode body portion comprising a plurality of concentric tubes and having the electrode face member mounted at one end thereof, the tube of smallest diameter forming a central passageway through the electrode, at least one of the tubes being composed of electrically conductive material for bringing electrical current to the electrode face member to produce and sustain an arc from the electrode face member, the tubes being of graduated diameters and spaced from each other to form a plurality of cylindrical passageways therebetween, one cylindrical passageway between the outer tube and the next adjacent tube bringing a cooling fluid to the electrode face member, another cylindrical passageway conducting fluid from the electrode face member, and means passing through the electrode body portion for bringing an energizing potential to the magnetic field producing coil.

12. An electrode according to claim 11 including, in addition, heat shield means disposed around the outside of the electrode, and other heat shield means disposed in the central passageway passing through the electrode.

13. An electrode according to claim 11 additionally characterized as having two of the tubes composed of conductive material, said last-named two tubes being threadedly connected to the electrode face member, both of said last-named two tubes being operatively connected to the same terminal of a source of electrical potential whereby current flows down both of said last-named two tubes to form an arc at the arcing surface of the electrode face member.

14. An electrode according to claim 11 including, in addition, removable cover means covering the upper end of the central passageway through the electrode, the removable cover means being adapted to be removed for selectively inserting melt material through the central passageway into the melt in the furnace and selectively inserting fuse material into the furnace, the cover means being adapted to be thereafter replaced.

References Cited
UNITED STATES PATENTS

| | | | |
|---|---|---|---|
| 2,286,210 | 6/1942 | Klemperer et al. | 219—97 |
| 2,472,851 | 6/1949 | Landis et al. | 219—123 |
| 3,048,736 | 8/1962 | Emmerich | 313—161 |
| 3,097,321 | 7/1963 | Le Row et al. | 313—32 |
| 3,201,560 | 8/1965 | Mayo et al. | 219—121 |
| 3,309,550 | 3/1967 | Wolf et al. | 313—231 |

BERNARD A. GILHEANY, *Primary Examiner.*

H. B. GILSON, *Assistant Examiner.*